United States Patent [19]
Messenger

[11] Patent Number: 5,965,221
[45] Date of Patent: Oct. 12, 1999

[54] TRANSPARENT PLAQUE WITH ENHANCED LIGHT REFLECTION

[76] Inventor: Ronald L. Messenger, 7854 White Fir St., Reno, Nev. 89523

[21] Appl. No.: 08/850,501

[22] Filed: May 2, 1997

[51] Int. Cl.[6] .................................................. B44C 5/04
[52] U.S. Cl. .......................... 428/13; 428/14; 428/913.3
[58] Field of Search .............................. 428/13, 14, 913.3

[56] References Cited

U.S. PATENT DOCUMENTS

| | | | |
|---|---|---|---|
| 1,592,398 | 7/1926 | Van Bloem | 40/616 |
| 2,065,406 | 12/1936 | Silverman | 428/13 |
| 2,294,865 | 9/1942 | Frankenthal et al. | 428/156 X |
| 2,354,857 | 8/1944 | Gits et al. | 428/187 X |
| 2,636,301 | 4/1953 | Wilmsen | 428/13 |
| 2,731,672 | 1/1956 | Davis et al. | |
| 3,312,197 | 4/1967 | Smith | 428/13 X |
| 3,406,475 | 10/1968 | O'Donnell | 40/546 |
| 3,417,175 | 12/1968 | Brown et al. | 264/220 |
| 3,632,695 | 1/1972 | Howell | 264/2.5 |
| 3,747,440 | 7/1973 | Camilleri | 264/219 X |
| 3,956,837 | 5/1976 | Itano | 428/13 X |
| 3,973,342 | 8/1976 | Gubela | 428/31 X |
| 4,043,084 | 8/1977 | Kuris | 428/13 X |
| 4,169,323 | 10/1979 | Engel | 428/13 X |
| 4,180,930 | 1/1980 | DiMatteo | 428/13 X |
| 4,330,578 | 5/1982 | Nishihara et al. | 428/13 |
| 4,546,019 | 10/1985 | Schneider | 428/13 |
| 4,687,609 | 8/1987 | Strugatz | 264/219 X |
| 4,883,554 | 11/1989 | Bida | 428/913.3 X |
| 5,013,494 | 5/1991 | Kubo et al. | 264/219 X |
| 5,189,531 | 2/1993 | Palmer et al. | 264/1.31 X |
| 5,223,357 | 6/1993 | Lovison | 428/13 X |
| 5,369,553 | 11/1994 | Trusiani | 362/31 |
| 5,419,940 | 5/1995 | Wood et al. | 428/13 |
| 5,538,674 | 7/1996 | Nisper et al. | 428/30 X |

*Primary Examiner*—Henry F. Epstein
*Attorney, Agent, or Firm*—Bernhard Kreten

[57] ABSTRACT

A plaque and method of manufacture including a flat sheet of tinted transparent plastic having a smooth front viewing face and a rear face having a line drawing integrally molded thereto. When viewed through the front face, the line drawing presents to the viewer a glow according to the color of the tinting and an illusion of line drawing relief upon the front face. In a modification, the plaque can be backed by a black reflecting plate, and in another modification the plaque can be edge illuminated by an artificial light source. The plaque is made by CNC machining a grooved engraving on a polished steel plate and placing the engraved plate in an injection molding machine to cause molten plastic to cover the plate and flow into the grooves.

30 Claims, 3 Drawing Sheets

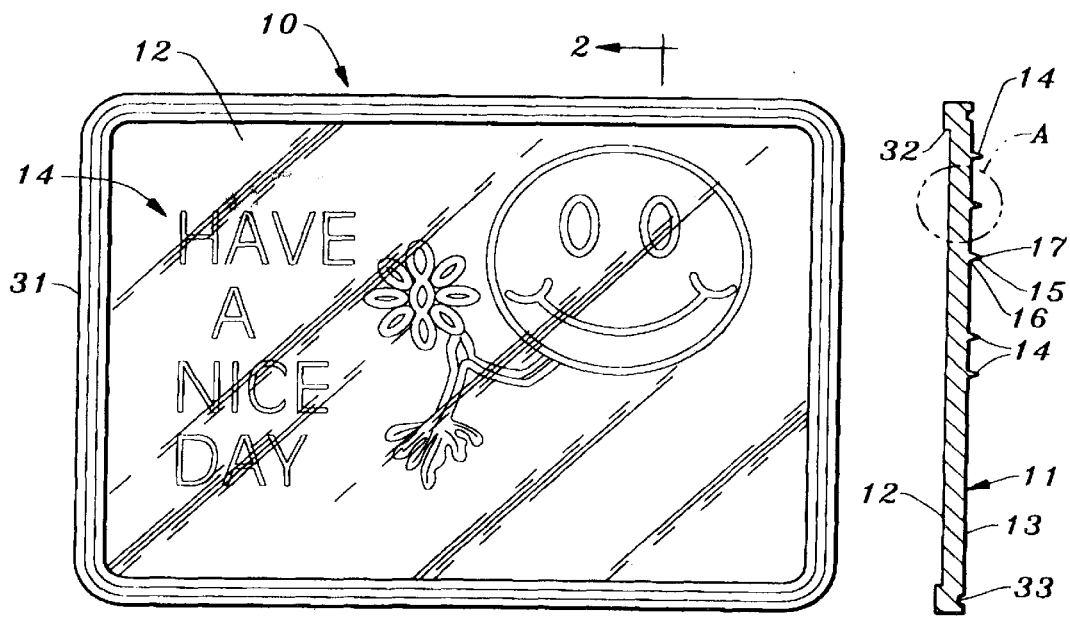
Fig. 1
Fig. 2
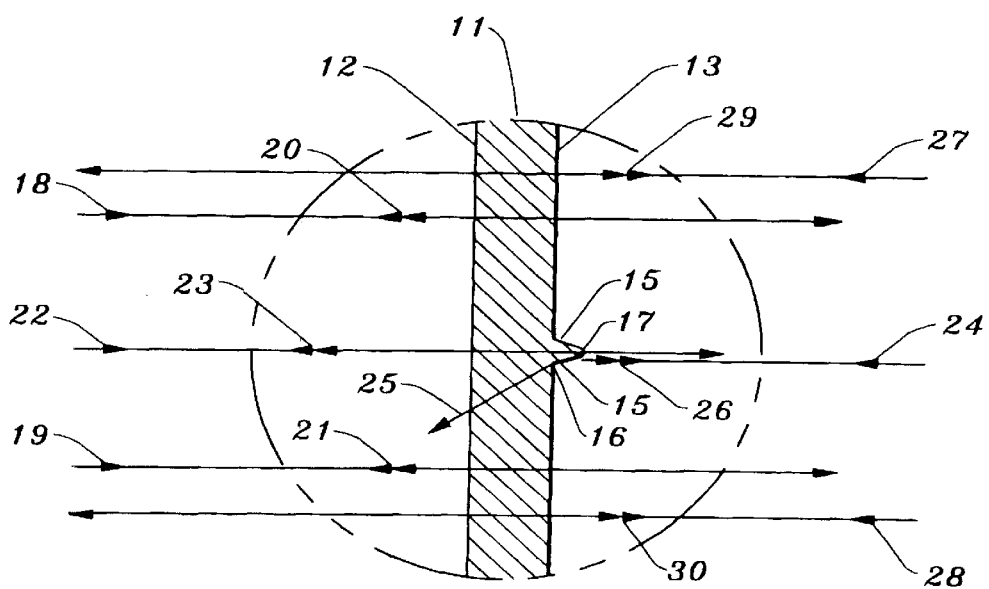
Fig. 3

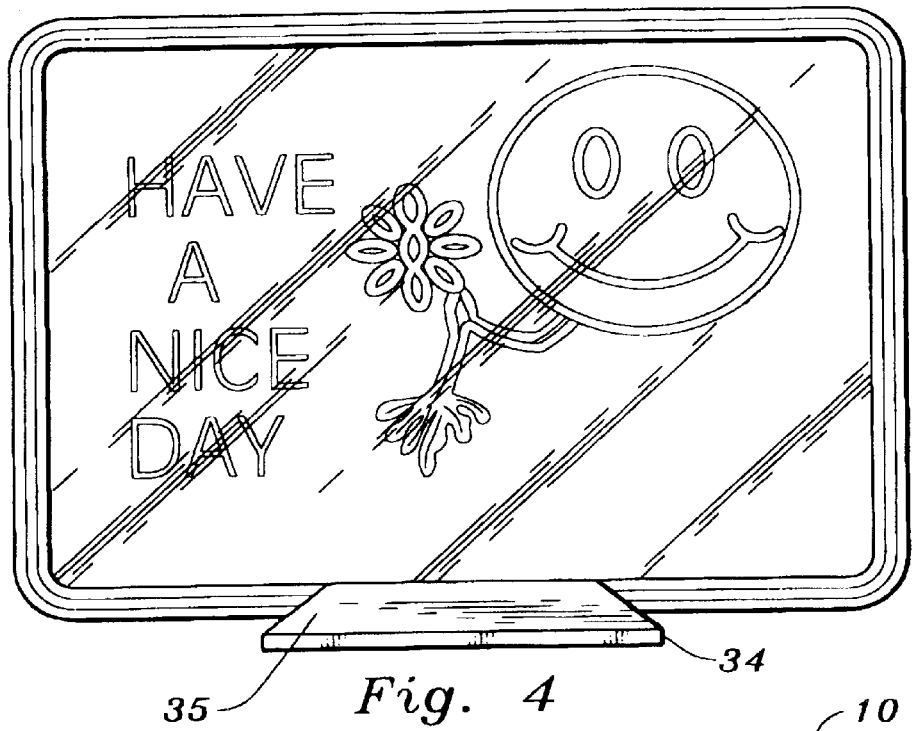
Fig. 4
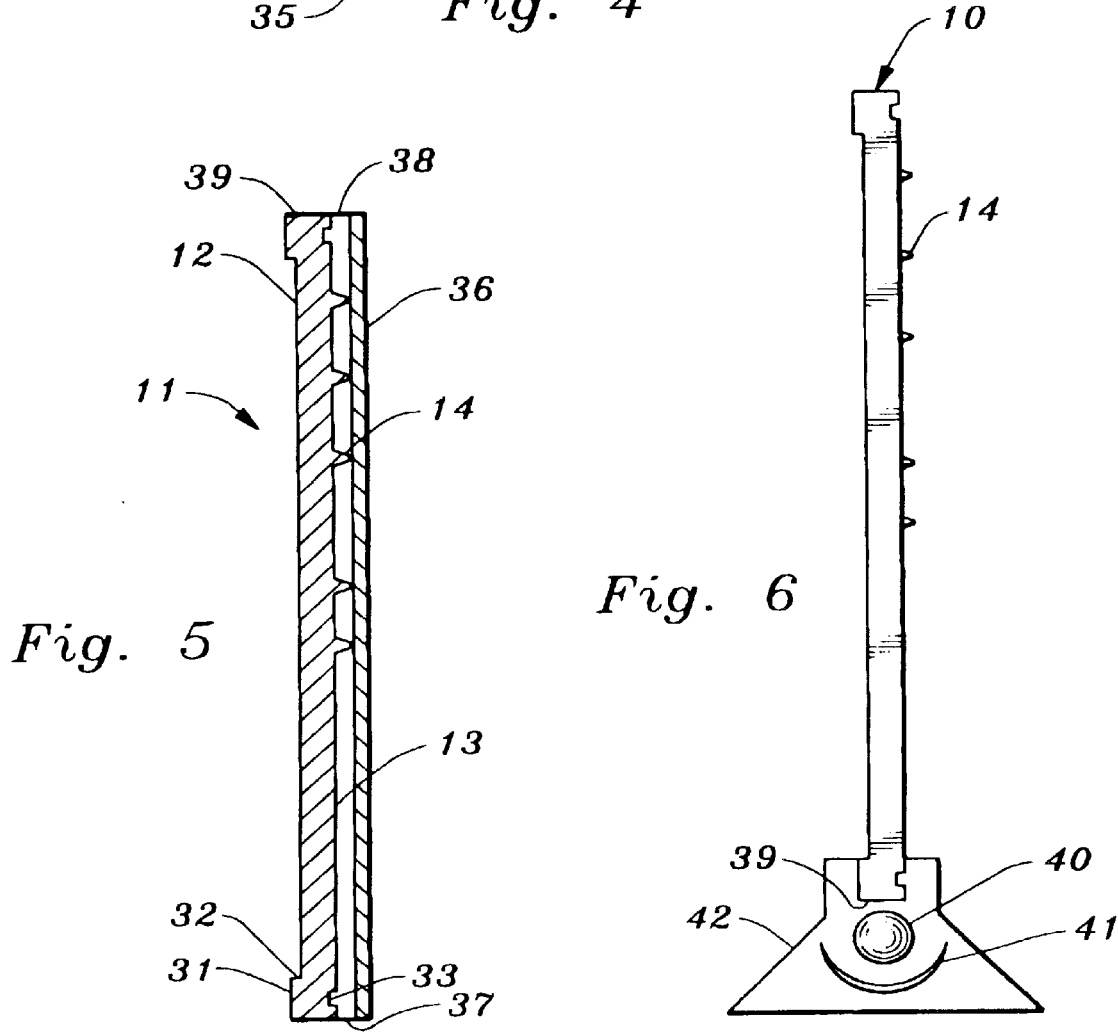
Fig. 5
Fig. 6

TRANSPARENT PLAQUE WITH ENHANCED LIGHT REFLECTION

FIELD OF THE INVENTION

This invention relates to the structural design of a small plaque and a method of mass producing it to lower the cost. There are at present numerous small plaques and signs competing with each other in the marketplace for the attention of buyers. A plaque or sign which possesses some special eye appeal in addition to having a low cost has an advantage over the competition.

The plaque of this invention is made of a unitarily molded plastic plate with an integral line pattern on one side. No additional molding, engraving or painting is required. The molding operation involves a single engraved metal plate and a conventional molding apparatus.

BACKGROUND OF THE INVENTION

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. Pat. No. | ISSUE DATE         | INVENTOR          |
| ------------- | ------------------ | ----------------- |
| 1,592,398     | July 13, 1926      | Van Bloem         |
| 2,065,406     | December 22, 1936  | Silverman         |
| 2,294,865     | September 1, 1942  | Frankenthal, et al. |
| 2,354,857     | August 1, 1944     | Gits, et al.      |
| 2,636,301     | April 28, 1953     | Wilmsen           |
| 2,731,672     | January 24, 1956   | Davis, et al.     |
| 3,312,197     | April 4, 1967      | Smith             |
| 3,406,475     | October 22, 1968   | O'Donnell         |
| 3,417,175     | December 17, 1968  | Brown, et al.     |
| 3,632,695     | January 4, 1972    | Howell            |
| 3,747,440     | July 24, 1973      | Camilleri         |
| 3,973,342     | August 10, 1976    | Gubela            |
| 4,043,084     | August 23, 1977    | Kuris             |
| 4,180,930     | January 1, 1980    | Dimatteo          |
| 4,330,578     | May 18, 1982       | Nishihira, et al. |
| 4,546,019     | October 8, 1985    | Schneider         |
| 4,687,609     | August 18, 1987    | Strugatz          |
| 4,883,554     | November 28, 1989  | Bida              |
| 5,013,494     | May 7, 1991        | Kubo, et al.      |
| 5,189,531     | February 23, 1993  | Palmer, et al.    |
| 5,223,357     | June 29, 1993      | Levison           |
| 5,369,553     | November 29, 1994  | Trusiani          |
| 5,538,674     | July 23, 1996      | Nisper, et al.    |

The patent to Van Bloem shows a sign formed of a translucent glass plate 1 having on its rear side deeply impressed characters C which can be viewed from the front of the plate.

The patent to Silverman shows a glass plate 10 having a recessed design sand-blasted into the rear face. The recessed design is backed by metallic foil so as to be clearly visible from the front face of the plate.

The patent to Frankenthal, et al. teaches a method of making a sign wherein a metal plate is etched to form a design having raised and recessed portions. The design is transferred to a secondary block 2 by stamping to yield a negative of the original design. The plate 2 is then placed in a molding apparatus and filled with a molding powder which is compressed against the plate 2 by a top die 4 to form the completed sign.

The patent to Gits, et al. shows a transparent molded sign having indicia and design recesses 4', 6 and 7 in its rear face. The recesses are sprayed with a colored material to render them more visible when viewed from the front of the sign.

The patent to Gubela shows a sign having a body plate 12 with indicia 18 embossed on a front viewing face. The plate is backed by reflective prisms 13. Various methods of molding the sign are disclosed.

The patent to Strugatz teaches a method of making a molded plastic line drawing wherein the lines of the drawing are first sketched on a tape covering the surface of a glass mold. The line drawing is then cut out of the taped covering and sand blasted to create recesses in the glass mold corresponding to the drawing. The remaining tape is removed and the glass mold is covered with a liquid polyester mixture which flows into the recesses in the mold. The cured polyester is then removed and the raised lines in the polyester forming the picture are colored as needed.

The patent to Trusiani shows an illuminated picture formed of a sheet of transparent plastic having a series of cut-out lines which define the outline of a map or picture. The plastic sheet is edge illuminated to reflect light from all the cut-outs to provide an illuminated line display. A computer controlled laser is employed to cut the pattern in the plastic sheet.

The other prior art listed above but not specifically described teach other designs of plaques and signs and further catalog the prior art of which applicant is aware. These references diverge even more starkly from the references specifically distinguished above.

SUMMARY OF THE INVENTION

This invention teaches a novel plaque or sign formed of a flat sheet of transparent plastic having a smooth front viewing face and a rear face supporting a line drawing and/or indicia hereinafter referred to as a line drawing. The line drawing is integrally molded with the plastic sheet in a raised pattern extending away from the rear surface. When viewed through the front face the line drawing is considerably brighter than when viewed from the rear face because of increased reflectivity and diffusion at the interface between the rear surface and line drawing.

It is preferred to tint the plastic with a desirable color to enhance the appearance while still maintaining transparency.

The simple construction of the plaque enables a straightforward molding method involving injection molding over a flat engraved plate.

OBJECTS OF THE INVENTION

The overall object of the invention is the design of a plaque having a line drawing integrally molded on the rear face of a flat, transparent, plastic sheet. The arrangement yields increased ambient light reflectivity causing the line drawing to emit a glow as viewed from the front surface of the flat plate.

It is a specific object of the invention to manufacture a plaque in a simple low cost manner. A line drawing or a message is first sketched on a drawing sheet. The drawing is then cut into the surface of a highly polished plate by means of CNC machining to produce relatively deep grooves therein corresponding to the lines of the drawing. The grooved plate is then placed in an injection molding machine where plastic material is caused to flow in the etched grooves while leaving all other surfaces of the plastic material flat and smooth.

It is another object of the invention to illuminate an edge portion of the disclosed novel plaque to cause the drawing lines to glow in an attractive manner.

It is another object of the invention to support the plaque in an upright manner on a flat surface by means of a supporting fixture.

It is yet another object of the invention to provide a black background behind the rear face of the plaque to enhance reflectivity.

Viewed from a first vantage point, it is an object of the present invention to provide a decorative article comprising a transparent plastic plate having a flat front viewing face, and a rear generally flat face, the rear flat face supporting a raised decorative pattern outline integrally molded with the plastic plate, the decorative pattern being viewed through the front face.

Viewed from a second vantage point, it is an object of the present invention to provide a decorative article comprising a tinted transparent plastic plate having a flat front viewing face, and a rear generally flat face supporting a raised decorative line drawing integrally molded with the plastic plate, the lines forming the line drawing being substantially V-shaped in cross section with the apex of the V being remote from the rear face whereby when viewed from the front face the line drawing presents to the viewer a glow according to the color of the tinting and an illusion of line drawing relief upon the front face.

Viewed from a third vantage point, it is an object of the present invention to provide a plaque comprising a rectangular, tinted, transparent, plastic plate having a flat front viewing face, and a rear generally flat face, the rear flat face supporting a raised decorative pattern integrally molded on the plastic plate, a housing mounted around a bottom edge of the rectangular plaque, a source of light in the housing, the light entering the bottom edge of the plaque and propagating through the plastic plate whereby when viewed from the front face the raised decorative pattern presents to the viewer a glow according to the color of the tinting and an illusion of pattern relief upon the front face.

Viewed from a fourth vantage point, it is an object of the present invention to provide a method of making a decorated plaque comprising the steps of: (a) preparing a line drawing on a drawing surface; (b) scanning the line drawing with a scanning unit to convert the line drawing to equivalent data stored in a computer; (c) controlling a CNC machine tool equipped with an engraving cutting bit to groove a polished steel plate with an engraving representing the line drawing; (d) installing the engraved steel plate in a molding cavity of an injection molding machine; (e) injecting a molten, translucent plastic under pressure into the cavity to completely cover the steel plate and to flow into the engraved grooves; and (f) cooling the mold cavity and removing the plaque so formed as a finished article.

Viewed from a fifth vantage point, it is an object of the present invention to provide a method for injection forming a plastic plate, the steps including: forming a mold surface with a mirror finish on one face; machining grooves on the one face such that the grooves extend beyond the mirror finish and the grooves exhibit a roughened contour compared to the mirror finish, and; placing the mold surface into an injection molding machine such that the grooves receive plastic therewithin and the mirrored surface causes the plastic in contact therewith to be smooth.

These and other objects will be made manifest when considering the following detailed specification when taken in conjunction with the appended drawing figures.

BRIEF DESCRIPTION OF THE DRAWINGS

FIG. 1 is a plan view of a plaque according to the invention with a particular design and message.

FIG. 2 is a cross sectional view taken along the lines 2—2 of FIG. 1.

FIG. 3 is an enlarged view of circular portion A in FIG. 1 illustrating the enhanced reflection achieved in the inventive design.

FIG. 4 is a front view of the FIG. 1 plaque held in a vertical position by a supporting fixture.

FIG. 5 shows a modification wherein a black plate covers the rear face of the plaque.

FIG. 6 shows a modification employing edge illumination of the plaque.

DESCRIPTION OF PREFERRED EMBODIMENTS

Figure 8:
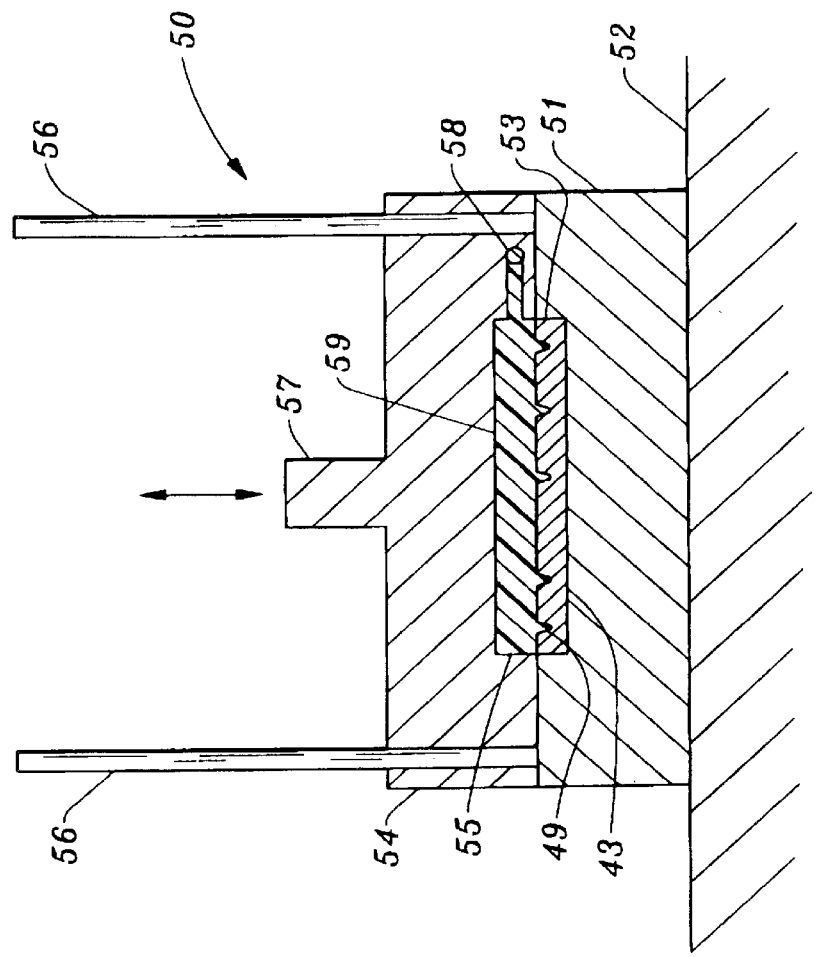
FIG. 8 is a sectional view of an injection molding apparatus for making the plaque.

Considering the drawings, wherein like reference numerals denote like parts throughout the various drawing figures, reference numeral 10 is directed to the basic plaque according to the present invention. The plaque is integrally molded in an injection molding apparatus to be later described and comprises a generally flat sheet 11 having a smooth flat front face 12 and a rear face 13. The sheet 11 is transparent and a line drawing and message 14 integrally molded on the rear face 13 is viewed through the front face as shown in FIG. 1.

As best seen in FIGS. 2 and 3, the individual lines forming the line drawing and message extend outwardly from rear face 13 which is otherwise smooth and flat. Each individual line is formed of sloping sides 15 extending from a base portion 16 and converging to a peak 17 having a sharp apex formed by the convergence of two planer sides to, therefore, enhance certain indices of refraction. It is important to note that each line drawing 15–17 is raised with respect to flat face 13 and is not recessed within face 13 as commonly practiced in the prior art.

The line drawing when viewed through front face 12, as shown in FIG. 1, exhibits a novel and pleasing lighting effect because of enhanced reflection back to the viewer. While a number of complicated optical phenomenon are at work here, FIG. 3 shows a simplification for explanatory purposes.

Arrows 18 and 19 represent light rays from a natural or artificial source impinging on face plate 12. Upon striking the face plate, a fraction of the light ray is reflected back as shown by the double arrows 20 and 21, while the rest of the light passes through plate 11 and rear surface 13. A ray 22 impinging on face plate 12 at a location where it passes through plate 11 and line drawing 14 at peak 17, is reflected back with greater intensity as shown by double arrows 23 and with decreased intensity after leaving peak 17. The increased reflection back to an observer is caused by the increased path length and increased internal reflections due to the sloping shape of the line drawing as shown at 15. Reflected rays 20, 21, and 23 combine at the eye of an observer viewing face plate 12 to display an increased light intensity reflected by the line drawing.

On the other hand, a central ray 24 striking slope 15 from the rear will be deflected and scattered as shown at 25 with only a small portion 26 being reflected back to an observer.

Back rays 27 and 28 produce reflected rays 29, 30 as explained in connection with rays 18 and 19. Back reflected rays 26, 29, and 30 combine at the eye of an observer to yield less light intensity than developed with front reflected rays 20, 21, and 23. This increase in light intensity, as viewed from the front, causes the line drawings to appear to glow and to produce the illusion of line drawing relief upon the front face of the plaque. The effect is enhanced by using a colored but still transparent plastic.

The plaque is surrounded by an integrally molded frame 31 which projects above face 12 as shown at 32 in FIG. 2. A channel 33 is provided on the rear face which defines the periphery of the plaque. The plaques can be made in all sizes ranging from large wall mounted pictures to decorative plaques for institutional purposes and for product identification. An interesting application in the use of a plaque according to the invention on an office desk. FIG. 4 shows the plaque of FIG. 1 supported in an upright manner on a flat surface by means of a small plastic support 34. The plaque is held in a channel 35 provided in the support 34.

FIG. 5 shows a modification of the invention wherein an opaque black plate 36 is mounted against rear face 13 in abutting relation with line drawing 14. Black plate 36 can be secured to plate 11 by any suitable means here shown as adhesive strips 37. The black plate acts as a background, accentuating the light reflected by the line drawing. In order to enhance light reflection, the black plate must be spaced from surface 13 by a distance 38 at least equal to the height of line drawing 14. Painting the surface 13 directly with a coat of black paint almost completely destroys the reflecting properties of the line drawing.

FIG. 6 shows a modification wherein the plaque 10 is illuminated at its bottom edge 39 by means of a light source 40 which may include a reflector 41 mounted in a supporting stand 42. Light from source 40 enters edge 39 and propagates through the plastic where it strikes the line drawing and is radiated to an observer as a line glow. The use of a slight coloration of the plastic greatly enhances the effect. The tinting colors red, green, and yellow are particularly effective. It is believed that light traveling in a surface mode aids in this edge glow process.

Figure 7:
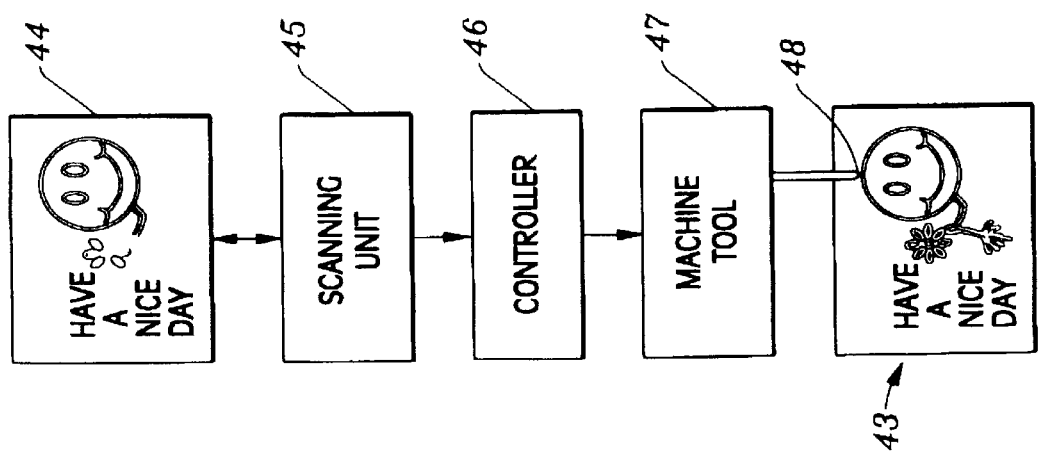
FIG. 7 is a schematic representation of the method of making the engraving plate.

The novel method of making the inventive plaque will now be described. FIG. 7 is a schematic representation of the method of making the engraving plate 43 used to make the plaque in an injection molding process. A line drawing 44, here shown as the drawing employed in FIG. 1, is first sketched on a drawing surface. Using state of the art computer technology, the drawing is scanned by scanning unit 45 and converted to a computer program in a controller 46 which in turn instructs a machine tool 47 to execute a machining operation duplicating the drawing 44.

The control of machine tool 47 by controller 46 is known as CNC machining which stands for computerized numerical control. Machine tool 47 can be of any type including milling machines, lathes, electric discharge machines, grinders and laser cutting machines.

CNC machining tool 47 is shown here as a modified milling machine having a cutting tool, with a V-shaped cutting tip 48 traversing fixed plate 43 to engrave the drawing 44 in its surface with V-shaped grooves or valley-type depressions 49 (FIG. 8). Plate 43 is about one-eighth inch thick with a highly polished surface to receive the engraving.

FIG. 8 shows an injection molding apparatus for manufacturing the plaque 10. A bottom mold 51 supported on surface 52 is provided with a mold cavity 53 which receives the engraved plate 43 with the V-shaped grooves or depressions 49 facing upwardly. A top mold 54 having a mold cavity 55 matching mold cavity 53 is reciprocated on support rods 5 by means of a mechanism (not shown) acting on stem 57 to close and open the cavities 53 and 55. Top mold 54 has a gate 58 which allows the injection of molten plastic material under pressure into cavities 53 and 55.

The operation is as follows: with top mold 54, sealed against bottom mold 51, molten plastic material is injected under heat and pressure through gate 58 to completely fill the mold cavities 53 and 55. The plastic material may comprise any commercially available resin which produces a transparent and impact resistant product after being injection molded. The molten plastic will fill grooves 49 forming the line drawing 14 while forming a smooth flat surface between the grooves. The upper or front face of the plaque will be completely flat and smooth as formed by the smooth surface of top surface 59 of top mold cavity 55. The channeling in molds 51 and 54 to form frame 31 has not been shown to avoid complicating the drawing.

After allowing sufficient time for the plastic to cool, top mold 54 is raised and the plaque removed and the process is repeated. It is important to note that the plaque in all of the method steps from drawing to finished product required only a positive image and can always be read from left to right.

Moreover, having thus described the invention, it should be apparent that numerous structural modifications and adaptations may be resorted to without departing from the scope and fair meaning of the instant invention as set forth hereinabove and as hereinbelow by the claims.

I claim:

1. A decorative article comprising a transparent plastic plate having a flat front viewing face, and a rear generally flat face, said rear flat face supporting a raised decorative pattern outline integrally molded with said plastic plate, said decorative pattern when viewed through said front face provides an illusion of dimensions because said front face is a substantially smooth plane and portions of said rear face are smooth while others provide an index of refraction gradient.

2. The combination of claim 1 wherein said decorative pattern comprises a line drawing.

3. The combination of claim 2 wherein said decorative pattern includes a message.

4. The combination of claim 2 wherein said transparent plastic plate is lightly colored.

5. The combination of claim 2 wherein the lines forming the raised line drawing when viewed in cross section are wider at the base than the end remote from the base.

6. The combination of claim 5 wherein said lines are substantially V-shaped in cross section.

7. The combination of claim 1 wherein said decorative article comprises a rectangular plaque with an integral frame.

8. A decorative article comprising a tinted transparent plastic plate having a flat front viewing face, and a rear generally flat face supporting a raised decorative line drawing integrally molded with said plastic plate, the lines forming said line drawing being substantially V-shaped in cross section with the apex of the V being remote from said rear face whereby when viewed from the front face the line drawing presents to the viewer a glow according to the color of the tinting and an illusion of line drawing relief upon the front face.

9. The combination of claim 8 wherein said decorative article comprises a rectangular plaque with an integral frame.

10. The combination of claim 9 wherein said decorative line drawing includes a message.

11. The combination of claim 9 including a black reflecting plate mounted against said rear face and spaced therefrom by said line drawing.

12. The combination of claim 9 including a mounting fixture for supporting said rectangular plaque in an upright manner, said fixture having a flat bottom to rest on a flat surface and a top portion with a channel to receive the bottom edge of said rectangular plaque.

13. A plaque comprising a rectangular, tinted, transparent, plastic plate having a flat front viewing face, and a rear generally flat face, said rear flat face supporting a raised decorative pattern integrally molded on said plastic plate, a housing mounted around a bottom edge of said rectangular plaque, a source of light in said housing, said light entering said bottom edge of said plaque and propagating through said plastic plate whereby when viewed from the front face the raised decorative pattern presents to the viewer a glow according to the color of the tinting and an illusion of pattern relief upon the front face.

14. The combination of claim 13 wherein said raised decorative pattern comprises a line drawing.

15. The combination of claim 13 wherein said housing includes a flat bottom to support said plaque in an upright manner on a flat surface.

16. A decorative article comprising a transparent plastic plate having a flat front viewing face, and a rear generally flat face, said rear flat face supporting a raised decorative pattern outline integrally molded with said plastic plate, said decorative pattern viewable through said front face to produce the illusion of a decorative pattern disposed upon said front face.

17. The decorative article of claim 16 wherein said decorative pattern comprises a line drawing.

18. The decorative article of claim 17 wherein said decorative pattern includes a message.

19. The decorative article of claim 17 wherein said transparent plastic plate is lightly colored.

20. The decorative article of claim 17 wherein the lines forming the raised line drawing when viewed in cross section are wider at the base than the end remote from the base.

21. The decorative article of claim 20 wherein said lines are substantially V-shaped in cross section.

22. The decorative article of claim 16 wherein said decorative article comprises a rectangular plaque with an integral frame.

23. A decorative article comprising a smooth flat front viewing face, a rear generally flat surface, and means molded on said rear generally flat surface for producing the illusion of a line drawing upon said front face.

24. The decorative article of claim 23 wherein said means for producing the illusion includes an integrally molded raised decorative pattern on said rear surface, said decorative pattern viewable through said front face.

25. The decorative article of claim 24 wherein said decorative pattern comprises a line drawing.

26. The decorative article of claim 25 wherein said decorative pattern includes a message.

27. The decorative article of claim 25 wherein said transparent plastic plate is lightly colored.

28. The decorative article of claim 25 wherein the lines forming the raised line drawing when viewed in cross section are wider at the base than the end remote from the base.

29. The decorative article of claim 28 wherein said lines are substantially V-shaped in cross section.

30. The decorative article of claim 24 wherein said decorative article comprises a rectangular plaque with an integral frame.

* * * * *